(No Model.)
B. J. DOWNING.
HAY STACKER.
No. 263,875. Patented Sept. 5, 1882.
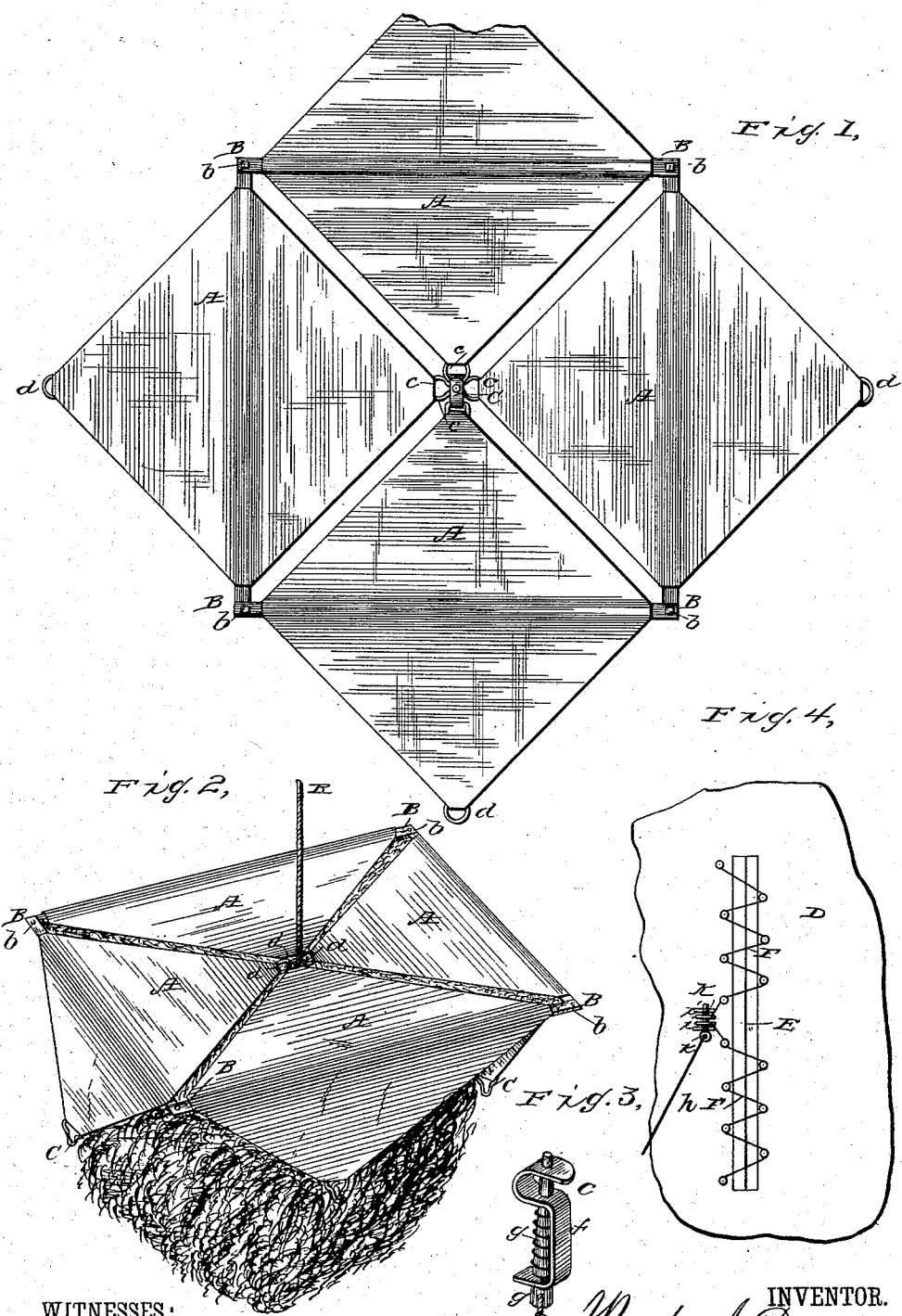

UNITED STATES PATENT OFFICE.

BURTON J. DOWNING, OF SEELY, KANSAS.

HAY-STACKER.

SPECIFICATION forming part of Letters Patent No. 263,875, dated September 5, 1882.

Application filed July 25, 1882. (No model.)

*To all whom it may concern:*

Be it known that I, BURTON J. DOWNING, of Seely, in the county of Cowley and State of Kansas, have invented certain new and useful Improvements in Hay-Stackers; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan or top view of my improved device for stacking hay. Fig. 2 is a perspective side view of the same, shown discharging the hay. Fig. 3 is a perspective detail view of the catch, and Fig. 4 is a plan view of a modification of my device.

Similar letters of reference indicate corresponding parts in all the figures.

My invention has relation to devices for hoisting hay from the ground to the stack or hay-loft, and has for its object to prevent its blowing away during its elevation.

To this end I employ a frame of poles or bars, as many as desired. In the accompanying drawings, where four are employed, each pole is designated by the letter B. These poles are connected at their ends by bolts $b$, or by other suitable means, and over them are stretched square pieces A, of canvas, netting, or other suitable material, the poles passing over them from one corner to the one diagonally opposite, and being fastened to the flaps or pieces A by being sewed into them, or by other suitable means. The flaps A have rings or hooks $d$ in their outer corners for passing the hoisting-rope R through, and larger rings or links $c$ in their inner corners, except one of the flaps that is provided with a catch, C. (Better shown in Fig. 3 of the drawings.) This catch consists of an S-shaped piece of flat iron, $f$, fastened at one side to the corner of one of the flaps, and provided with a spring-bolt, $g$, to which a rope or strong cord, $h$, is attached.

By the foregoing description, and by reference to the accompanying drawings, the way of using my device will be readily understood.

The frame formed by the poles B is put together and fastened by the bolts $b$. The inner corners of the flaps A are gathered and held together by the bolt $g$ of the catch C, passing through the rings $c$. The hay is now placed on the square of canvas formed by the four flaps by raking it on by a horse-rake, or by any other way, and when full the four outer corners are drawn together by the hoisting-rope R, being passed through the rings $d$ and fastened in one of them. When the device has been hoisted to the place where it is desired to discharge its load the rope or cord $h$ is pulled, which withdraws the bolt $g$ and liberates the rings $c$ and allows the hay to fall out, as shown in Fig. 2.

A modification of my device is shown in Fig. 4. It consists of only one piece of canvass or netting or other suitable material, D, which is slit open in the middle. This slit E is provided with two lace-cords, F, passing through hooks or eyes, one from each end of the slit, meeting in the middle of the slit, and each provided with an eye or ring in the free end $i$. These rings are held fast by a bolt, $k$, in a catch, K, operated in the same manner as catch C. The operating of this modification of my device is the same as by the other device, the four corners being drawn together by the hoisting-rope passing through the rings $l$ after the hay has been placed on the canvas. When the hay shall be discharged the bolt $k$ is withdrawn by pulling the cord attached to it, which permits the lace-cords to pass through the hooks or eyes, and thus the hay is discharged through the slit E.

Having thus described my invention, I claim and desire to secure by Letters Patent of the United States—

The herein-described device for stacking and loading hay or straw, the same consisting of a frame composed of the bars B, connected to one another and provided with the canvases A, said canvases having hooks or rings $d$ at the outer corners, and provided at the inner corners with rings or links $c$, in combination with a spring-catch, C, trigger-rope $h$, and hoisting-rope R, the whole constructed and combined to operate substantially in the manner and for the purpose herein shown and set forth.

In testimony that I claim the foregoing as my own I have hereunto affixed my signature in presence of two witnesses.

BURTON J. DOWNING.

Witnesses:
F. S. JENNINGS,
GEO. H. WILLIAMS.